US009124688B2

(12) United States Patent
Min et al.

(10) Patent No.: US 9,124,688 B2
(45) Date of Patent: *Sep. 1, 2015

(54) SYSTEM AND MOBILE TERMINAL FOR DISPLAYING CALLER INFORMATION AND METHOD THEREOF (71) Applicant: Pantech Co., Ltd., Seoul (KR)

(72) Inventors: Nam-Ki Min, Kyoungki-do (KR); Ki-Chul An, Kyoungki-do (KR)

(73) Assignee: Pantech Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/191,178

(22) Filed: Feb. 26, 2014

(65) Prior Publication Data

US 2014/0179291 A1 Jun. 26, 2014

Related U.S. Application Data (63) Continuation of application No. 12/553,328, filed on Sep. 3, 2009, now Pat. No. 8,675,844, which is a continuation of application No. 10/730,853, filed on Dec. 8, 2003, now Pat. No. 7,660,404.

(30) Foreign Application Priority Data

Dec. 7, 2002 (KR) ........................ 10-2002-0077576

(51) Int. Cl.
*H04M 1/56* (2006.01)
*H04M 15/06* (2006.01)
(Continued)

(52) U.S. Cl.
CPC ............ *H04M 3/42042* (2013.01); *H04M 1/57* (2013.01); *H04W 4/16* (2013.01); *H04W 4/20* (2013.01)

(58) Field of Classification Search
CPC ..... H04M 3/42042; H04M 1/57; H04M 3/56; H04M 3/4268
USPC ............. 379/142.01, 142.04, 142.06, 142.15, 379/142.16, 142.17, 88.11, 88.19, 93.23; 455/415, 416
See application file for complete search history.

(56) References Cited

U.S. PATENT DOCUMENTS 5,073,927 A 12/1991 Grube
H0001714 H 3/1998 Partridge, III
(Continued)

FOREIGN PATENT DOCUMENTS

EP 0741484 11/1996
EP 1069789 1/2001
(Continued)

OTHER PUBLICATIONS

Office Action dated Sep. 20, 2005 issued in U.S. Appl. No. 10/730,853.
(Continued)

*Primary Examiner* — Quoc D Tran
(74) *Attorney, Agent, or Firm* — H.C. Park & Associates, PLC (57) ABSTRACT Caller information display system includes a caller terminal, a service system and a receiver terminal. The caller terminal stores caller information and transmits data including the caller information during a call. The service system receives the data including the caller information from the caller terminal and transmits the data to a receiver terminal. The receiver terminal receives the data from the service system, stores the caller information to be linked with a telephone number of the caller terminal, and displays the caller information when a paging signal is received.

14 Claims, 8 Drawing Sheets (51) Int. Cl.
*H04M 3/42* (2006.01)
*H04M 1/57* (2006.01)
*H04W 4/20* (2009.01)
*H04W 4/16* (2009.01)

(56) References Cited

U.S. PATENT DOCUMENTS

| | | | |
|---|---|---|---|
| 5,761,279 | A | 6/1998 | Bierman et al. |
| 5,907,604 | A | 5/1999 | Hsu |
| 5,982,871 | A * | 11/1999 | Nagashima .................. 379/229 |
| 6,175,741 | B1 | 1/2001 | Alperovich |
| 6,675,008 | B1 | 1/2004 | Paik et al. |
| 6,687,362 | B1 | 2/2004 | Lindquist et al. |
| 6,810,115 | B2 | 10/2004 | Fukuda |
| 8,675,844 | B2 * | 3/2014 | Min et al. ................. 379/142.01 |
| 2001/0012351 | A1 | 8/2001 | Shaffer et al. |
| 2002/0126814 | A1 * | 9/2002 | Awada et al. ........... 379/142.01 |
| 2002/0137503 | A1 | 9/2002 | Roderique |
| 2003/0054863 | A1 | 3/2003 | Lee et al. |
| 2004/0067751 | A1 | 4/2004 | Vandermeijden et al. |
| 2007/0072596 | A1 * | 3/2007 | Sherman et al. .............. 455/415 |

FOREIGN PATENT DOCUMENTS

| | | |
|---|---|---|
| JP | 10-234068 | 9/1998 |
| KR | 2000-49381 | 8/2000 |
| KR | 2001-54524 | 7/2001 |
| KR | 2001-58785 | 7/2001 |
| KR | 2002-76027 | 10/2001 |
| KR | 10-2002-0017205 | 3/2002 |
| KR | 2002-24479 | 3/2002 |
| KR | 2002-32679 | 5/2002 |
| KR | 2002-46671 | 6/2002 |
| KR | 2002-74112 | 9/2002 |
| WO | 01/03406 | 1/2001 |
| WO | 02/062047 | 8/2002 |

OTHER PUBLICATIONS

Office Action dated Mar. 10, 2006 issued in U.S. Appl. No. 10/730,853.
Office Action dated Mar. 7, 2007 issued in U.S. Appl. No. 10/730,853.
Office Action dated Sep. 7, 2007 issued in U.S. Appl. No. 10/730,853.
Office Action dated Apr. 9, 2008 issued in U.S. Appl. No. 10/730,853.
Office Action dated Dec. 15, 2008 issued in U.S. Appl. No. 10/730,853.
Office Action dated May 22, 2009 issued in U.S. Appl. No. 10/730,853.
Notice of Allowance dated Sep. 24, 2009 issued in U.S. Appl. No. 10/730,853.
Notice of Allowance dated Nov. 1, 2013 issued in U.S. Appl. No. 12/553,328.
Non-Final Office Action dated May 23, 2013 issued in U.S. Appl. No. 12/553,328.
Final Office Action dated Sep. 8, 2011 issued in U.S. Appl. No. 12/553,328.
Non-Final Office Action dated Apr. 6, 2011 issued in U.S. Appl. No. 12/553,328.
Non-Final Office Action dated Nov. 9, 2010 issued in U.S. Appl. No. 12/553,328.

* cited by examiner

SYSTEM AND MOBILE TERMINAL FOR DISPLAYING CALLER INFORMATION AND METHOD THEREOF

CROSS-REFERENCE TO RELATED APPLICATIONS

This application is a continuation of U.S. patent application Ser. No. 12/553,328, filed on Sep. 3, 2009, which is a continuation of U.S. patent application Ser. No. 10/730,853, filed on Dec. 8, 2003, now U.S. Pat. No. 7,660,404, which claims priority from and the benefit of Korean Patent Application No. 10-2002-0077576, filed on Dec. 7, 2002, all of which are hereby incorporated by reference for all purposes as if fully set forth herein.

BACKGROUND OF THE INVENTION

1. Field of the Invention

The present invention relates to a mobile terminal and a system for displaying caller information and method thereof; and, more particularly, to a mobile terminal and system for storing and displaying the caller information such as pictures, avatars or moving pictures of a calling party by using a caller-ID service, and a method thereof.

2. Discussion of the Background

Hereinafter, a mobile terminal of a calling party is referred to as simply "a caller terminal" and a mobile terminal of a called party as simply "a receiver terminal".

Figure 1:
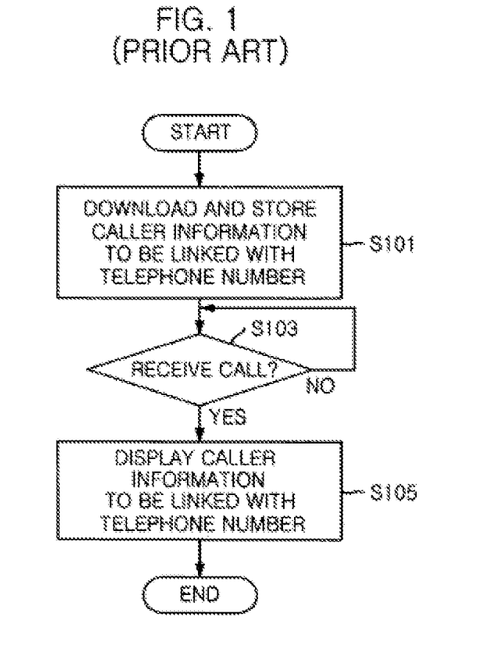
FIG. 1 is a flowchart showing a conventional caller information displaying method.

FIG. 1 is a flowchart showing a conventional caller information displaying method. Referring to FIG. 1, a receiver terminal downloads caller information such pictures, avatars and moving pictures of a caller from a web-site or a personal computer and stores the caller information to be linked with a telephone number stored in a telephone directory thereof at step S101. The receiver terminal receives a call from the caller terminal at step S103 to display caller information linked with a telephone number received by a caller-ID service on a display screen thereof at step S105.

Figure 2:
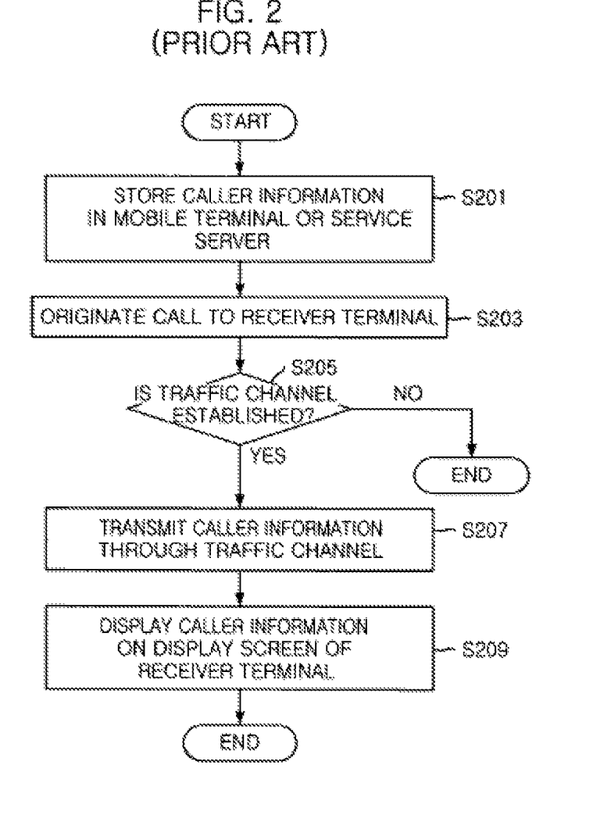
FIG. 2 is a flowchart showing another conventional caller information display method.

The conventional caller information display method of FIG. 1 has a problem in that the receiver terminal sets caller information one-sidedly and thus caller information is not timely updated. FIG. 2 is a flowchart showing another conventional caller information display method. Referring to FIG. 2, a user stores in advance his/her caller information in a caller terminal or in a service server at step S201. The caller terminal originates a call at step S203, and the caller terminal or service server checks whether or not a traffic channel is allocated between the caller terminal and the receiver terminal at step S205. When a traffic channel is established between the caller terminal and the receiver terminal, caller information stored in the caller terminal or the service server is transmitted to the receiver terminal at step S207.

When transmission of the caller information is completed, a bell rings, and the caller information is displayed on a display screen of the receiver terminal at step S209. The caller information displaying method of FIG. 2 also has a problem in that a bell does not ring until the caller information is completely received even though a service connection is already completed, whereby a substantial call setup time is considerably increased, leading to an increased load of a communication system.

SUMMARY OF THE INVENTION

Therefore, it is an object of the present invention to provide a mobile terminal and a system for displaying caller information which is convenient to a user.

It is another object of the present invention to provide caller information display system which can reduce a call setup time and a system load.

It is a still object of the present invention to provide caller information display method which is convenient to a user and can reduce a call setup time and a system load.

In accordance with one aspect of the present invention, there is provided a system for displaying caller information, including: a caller terminal for storing caller information and transmitting data including the caller information during a call; a service system for receiving the data including the caller information from the caller terminal and transmitting the data to a receiver terminal; and the receiver terminal for receiving the data from the service system, storing the caller information to be linked with a telephone number of the caller terminal, and displaying the caller information when a paging signal is received.

In accordance with another aspect of the present invention, there is provided a system for displaying caller information, including: a caller terminal for transmitting data including caller information and a phone number of a designed receiver terminal; a service system for temporarily storing the data received from the caller terminal and transmitting the data to the designed receiver terminal when the designed receiver terminal is in a state that the caller information can be received; and the receiver terminal for receiving the data from the service system, storing the caller information to be linked with a phone number of the caller terminal, and displaying the caller information when a paging signal is received.

In accordance with still another aspect of the present invention, there is provided a system for displaying caller information, including: a caller terminal; a service system for storing data including the caller information and phone numbers of designated receiver terminals and transmitting the caller information to the designated receiver terminal when the designated receiver terminal is in a state that can receive the caller information; and the receiver terminal for receiving the data from the service system, storing the caller information to be linked with a phone number of the caller terminal, and displaying the caller information when a paging signal is received.

In accordance with further another aspect of the present invention, there is provided a method for displaying caller information, including the steps of: (a) at a caller terminal, storing caller information and transmitting data including the caller information to a service system during a call; (b) at the receiver terminal, receiving the data from the service system to store the caller information to be linked with a phone number of the caller terminal; and (c) at the receiver terminal, displaying the caller information when a paging signal is received.

In accordance with further still another aspect of the present invention, there is provided a method for displaying caller information, the method including the steps of: (a) at a caller terminal, transmitting data packets including the caller information and a phone number of a designated receiver terminal to a service system; (b) at a service system, temporarily storing the data from the caller terminal and transmitting the data to the designated receiver terminal when the designated receiver terminal is in a state that can receive the caller information; (c) at the receiver terminal, receiving the data from the service system to store the caller information to be linked with a phone number of the caller terminal; and (d) at the receiver terminal, displaying the caller information when a paging signal is received.

In accordance with further still another aspect of the present invention, there is provided a method for displaying caller information, the method including the steps of: (a) at a service system, storing data including the caller information and a phone number of a designated receiver terminal and transmitting the caller information to the designated receiver terminal when the designated receiver terminal is in a state that can receive the caller information; (b) at the receiver terminal, receiving the data from the service system to store the caller information to be linked with a phone number of the designated receiver terminal; and (c) at the receiver terminal, displaying the caller information when a paging signal is received.

In accordance with further still another aspect of the present invention, there is provided a mobile terminal for displaying caller information, including: a radio frequency (RF) receiver for receiving data including caller information; a memory unit for storing the caller information to be linked with a telephone number of a caller terminal; and a controller for controlling a mobile terminal to display the caller information when a paging signal is received.

The caller information is automatically stored in the receiver terminal by linking a telephone number contained in the data with a telephone number stored in a telephone directory.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE ILLUSTRATED EMBODIMENTS

Figure 3:
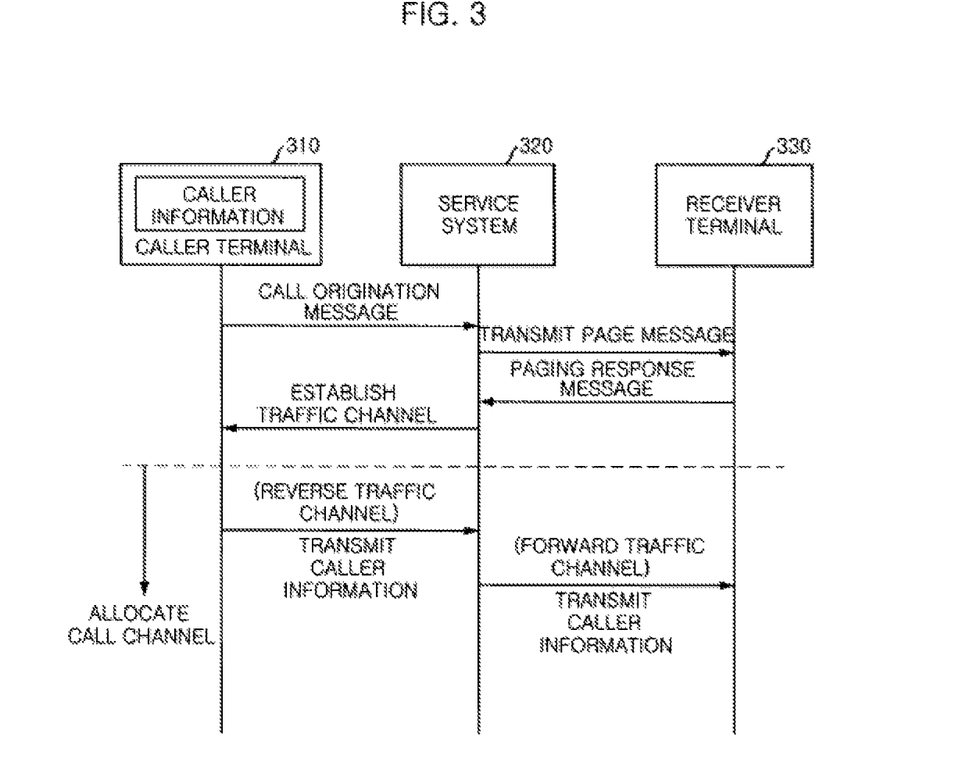
FIG. 3 is a view illustrating caller information display system in accordance with a preferred embodiment of the present invention.

Other objects and aspects of the invention will become apparent from the following description of the embodiments with reference to the accompanying drawings, which is set forth hereinafter. FIG. 3 is a view illustrating caller information display system in accordance with a preferred embodiment of the present invention. Referring to FIG. 3, the caller information display system includes a caller terminal 310, a service system 320 and a receiver terminal 330. In the caller information display system of FIG. 3, caller information is transmitted from the caller terminal 310 to the receiver terminal 330 during a call.

The caller terminal 310 stores caller information such as pictures, avatars and moving pictures of a calling party in a predetermined memory space thereof. The caller terminal 310 sends a call origination message and is allocated a traffic channel. After a service connection is completed, the caller terminal 310 transmits caller information previously set to the receiver terminal through a traffic channel during a call.

The service system 320 receives the call origination message and sends a general page message to the receiver terminal 330. When a page response message is received from the receiver terminal 330, the service system 320 establishes a communication between the caller terminal 310 and the receiver terminal 330.

The receiver terminal 330 receives the general page message and sends a page response message to be allocated a traffic channel. When a communication is established, the receiver terminal 330 receives caller information through the service system 320 from the caller terminal 310 during a call. Preferably, the received call information is automatically stored by linking a telephone number contained in the data with a telephone number stored in a telephone directory. The receiver terminal 330 displays the stored caller information on a display screen when the caller terminal 310 makes a phone call.

Figure 4:
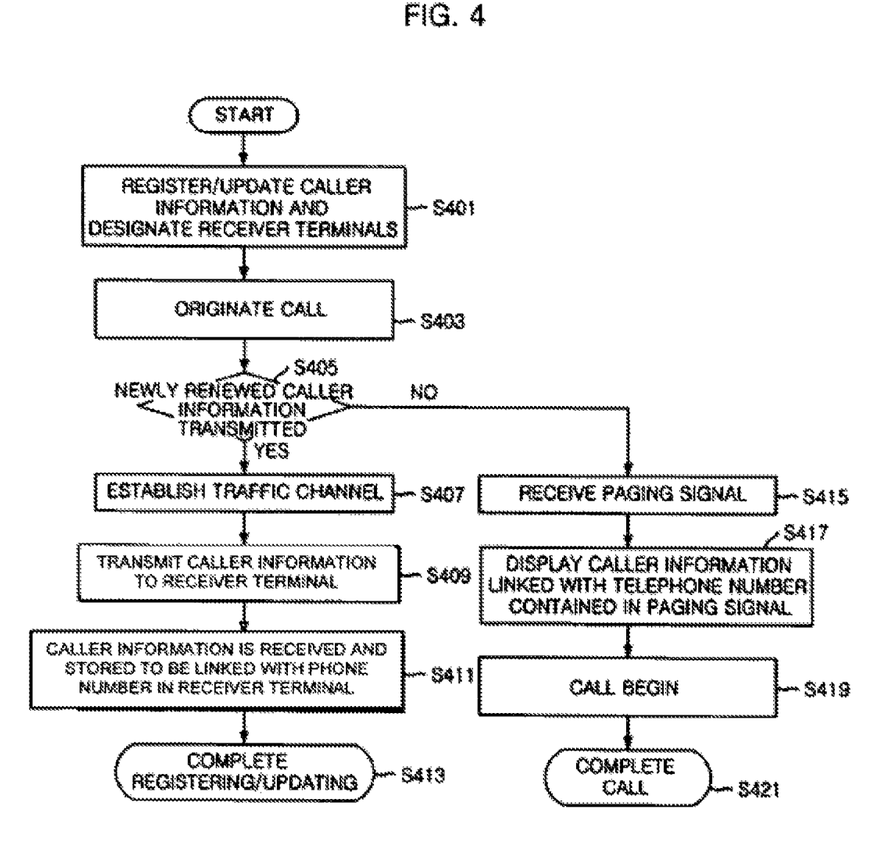
FIG. 4 is a flowchart illustrating a method for displaying caller information in accordance with a preferred embodiment of the present invention.

FIG. 4 is a flowchart illustrating a method for displaying caller information in accordance with a preferred embodiment of the present invention. Referring to FIG. 4, a user as a caller newly registers or updates caller information such as pictures, avatars or moving pictures, and selects or designates a receiver terminal or a group of receiver terminals which will receive the caller information at step S401. Selecting or designating the receiver terminals can be done during a call.

When a user as a caller selects a receiver terminal 330 to make a phone call (step S403), the caller terminal 310 determines whether or not caller information needs to be registered or updated for the receiver terminal 330 at step S405. That is, in the step of S405, the caller terminal 310 checks whether or not newly renewed caller information is transmitted to the selected receiver terminal 330.

In the case that caller information needs to be registered or updated in the receiver terminal 330, when the service system 320 establishes a communication between the caller terminal 310 and the receiver terminal 330 at step S407, the caller terminal 310 transmits the caller information to the receiver terminal 330 at step S409. The receiver terminal 330 receives the data including the caller information from the service system 320 through the forward traffic channel and stores the caller information to be linked with a phone number listed in a telephone directory at step S411, thereby registering or updating the caller information at step S413.

Here, if a phone number of the caller terminal 310 is not a number stored in the telephone directory of the receiver terminal 330, the phone number of the caller terminal 310 is temporarily stored in a predetermined memory space and becomes a state waiting for a registration of the caller information by a receiver, and thereafter the caller information is registered by a receiver. For example, a message asking a registration can be displayed on a screen of the receiver terminal.

If a phone number of the caller terminal 310 is a number stored in the telephone directory of the receiver terminal 330, the caller information is internally stored to be linked with a phone number of the caller terminal 310 while the previously set call information is externally display on a display screen, thereby updating the call information.

Meanwhile, in the case that there is no need that caller information is registered or updated in the receiver terminal 330, when a paging signal is received, the receiver terminal 330 displays caller information linked with a telephone number contained in the paging signal at step S417 before a call begins at step S419. Therefore, a user as a receiver can easily identify a caller.

As a modification of the caller information display system and method of FIGS. 3 and 4, caller information is stored in the service system 320 in advance by a predetermined method (e.g., Internet), and receivers are designated, and thereafter when a communication is established between the caller terminal 310 and the receiver terminal 330, the caller information is transmitted to the receiver terminal 330 and stored to be linked with a telephone number stored in a telephone directory.

Figure 5:
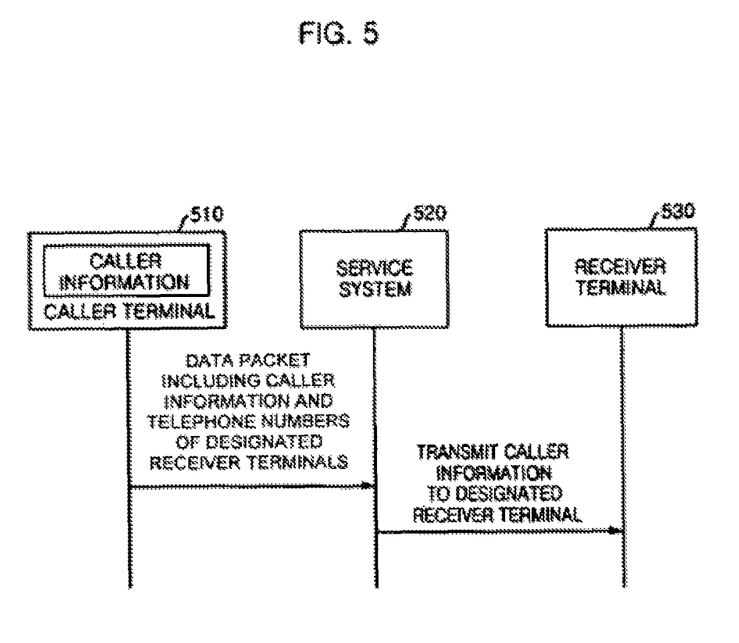
FIG. 5 is a view illustrating caller information display system in accordance with a preferred embodiment of the present invention.

FIG. 5 is a view illustrating caller information display system in accordance with a preferred embodiment of the present invention. Referring to FIG. 5, the caller information display system includes a caller terminal 510, a service system 520 and a receiver terminal 530. The caller information is transmitted to the receiver terminal 530 when the receiver terminal 530 is in a state that caller information can be received, e.g., during a call or in an idle state.

The caller terminal 510 serves to transmit to the service server 520 a data packet including caller information such as pictures, avatars and moving pictures of the calling party and telephone numbers of designated receiver terminals 530.

The service system 520 temporarily stores the data packet, and transmits the caller information to the designated receiver terminal 530 when the designated receiver terminal 530 is in a state that can receive the caller information.

The receiver terminal 530 receives the caller information from the service system 520 and stores the caller information to be linked with a telephone number stored in the telephone directory.

Figure 6:
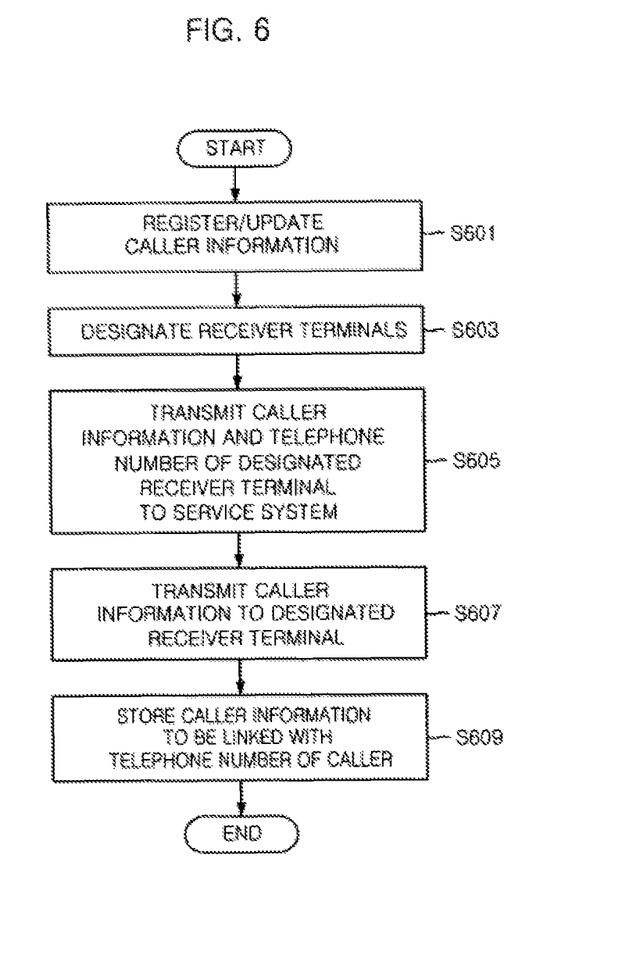
FIG. 6 is a flowchart illustrating a method for displaying caller information according in accordance with a preferred embodiment of the present invention.

FIG. 6 is a flowchart illustrating a method for displaying caller information in accordance with a preferred embodiment of the present invention. Referring to FIG. 6, a user as a caller registers or updates caller information such as pictures, avatars or moving pictures at step S601. A receiver terminal 530 or a group of receiver terminals 530 are designated at step S603. The caller terminal 510 transmits to the service system 520 caller information and a telephone number of the designated receiver terminal 530 in the form of preferably data packet at step S605.

The service system 520 temporarily stores a data packet received from the caller terminal 510 and transmits to the designated receiver terminal 530 caller information together with a caller's telephone number when the designated receiver terminal 530 is in a state that can receive caller information at step S607. The receiver terminal 530 stores the caller information to be linked with a caller's telephone number listed in a telephone directory at step S609, thereby registering or updating caller information. Thereafter, when the receiver terminal 530 receives a paging signal, steps S415 to S419 of FIG. 4 are performed.

Figure 7:
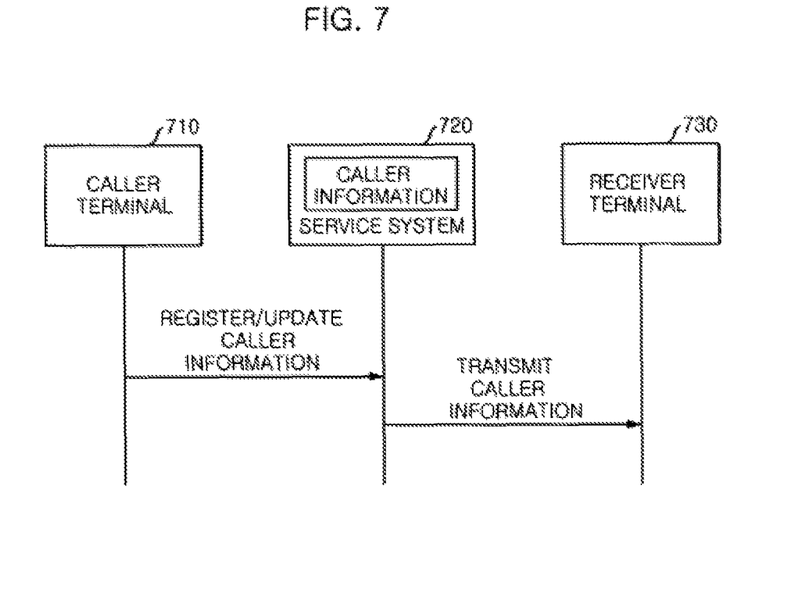
FIG. 7 is a view illustrating caller information display system in accordance with a preferred embodiment of the present invention.

FIG. 7 is a view illustrating caller information display system in accordance with a preferred embodiment of the present invention. Referring to FIG. 7, the caller information display system includes a caller terminal 710, a service system 720 and a receiver terminal 730. In the caller information display system of FIG. 7, caller information is transmitted to the receiver terminal 730 when the receiver terminal is in a state that caller information can be received, e.g., during a call or in an idle state.

A user as a caller registers or updates caller information in the service system 720, e.g., via a wireless Internet or a personal computer while designating the receiver terminals 730. The service system 720 stores caller information such as pictures, avatars or moving pictures and transmits to the designated receiver terminal 730 caller information together with a caller's telephone number when the designated receiver terminals 730 is in a state that can receive caller information. The receiver terminal 730 receives caller information from the service system 720 and stores caller information to be linked with a caller's telephone number stored in a telephone directory.

Figure 8:
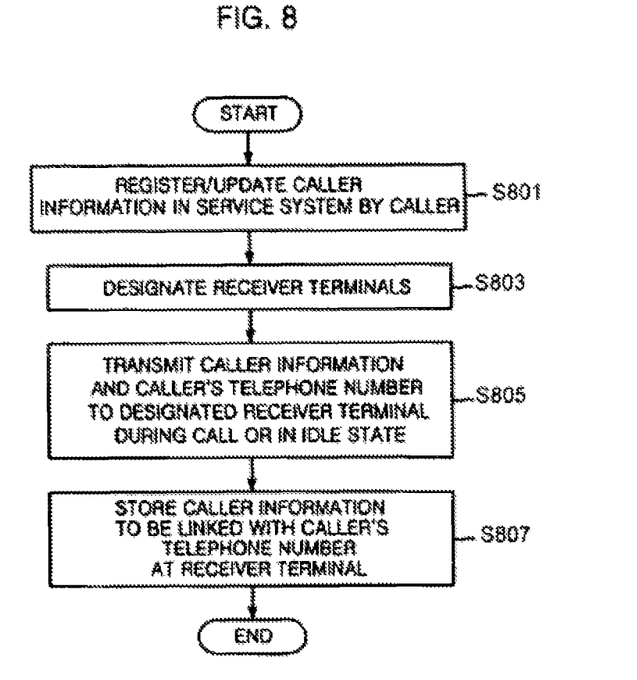
FIG. 8 is a flowchart illustrating a method for displaying caller information in accordance with a preferred embodiment of the present invention.

FIG. 8 is a flowchart illustrating a method for displaying caller information in accordance with a preferred embodiment of the present invention. Referring to FIG. 8, a user as a caller registers or updates caller information in the service system 720 at step S801 while selecting or designating a receiver terminal 730 or a group of receiver terminals 730 at step S803. The service system 720 transmits data including caller information and a caller's telephone number to the designated receiver terminal 730 when the designated receiver terminal 730 is available at step S805. The receiver terminal 730 receives and stores caller information to be linked with a caller's telephone number stored in a telephone directory at step S807, thereby registering or updating caller information. Thereafter, when the receiver terminal 530 receives a paging signal, steps S415 to S419 of FIG. 4 are performed.

As described herein before, the caller information display mobile terminal, system and method of the present invention are convenient to a user while reducing a system load and a substantial call setup time.

While the present invention has been shown and described with respect to the particular embodiments, it will be apparent to those skilled in the art that many changes and modifications may be made without departing from the spirit and scope of the invention as defined in the appended claims.

What is claimed is:

1. A first terminal, comprising:
   a transceiver;
   a controller to receive a call initiation request from the transceiver, to send a response to establish a traffic channel using the transceiver, and to receive from the transceiver caller information of a second terminal during a call with the second terminal after the traffic channel is established;
   a memory to store the caller information of the second terminal; and
   a display to display the caller information of the second terminal.

2. The first terminal of claim 1, wherein the caller information of the second terminal is received in a form of a packet.

3. The first terminal of claim 1, wherein the caller information of the second terminal comprises at least one of a telephone number, a picture, an avatar, and a moving picture corresponding to the second terminal.

4. The first terminal of claim 1, wherein the controller controls the transceiver to transmit caller information of the first terminal from the first terminal during a call after the traffic channel is established between the first terminal and the second terminal.

5. The first terminal of claim 4, wherein the transmitted caller information of the first terminal comprises at least one of a telephone number, a picture, an avatar, and a moving picture corresponding to the first terminal.

6. The first terminal of claim 4, wherein the caller information of the first terminal is transmitted in a form of a packet.

7. The first terminal of claim 1, wherein the controller determines whether caller information of the first terminal has been sent to the second terminal, and controls the transceiver to transmit the caller information of the first terminal to the second terminal based on the determination.

8. A method comprising:
- receiving a call initiation request at a first terminal;
- sending from the first terminal a response to establish a traffic channel;
- receiving caller information of a second terminal during a call with the second terminal, after the traffic channel is established;
- storing, in the first terminal, the caller information of the second terminal; and
- displaying, on the first terminal, the caller information of the second terminal.

9. The method of claim 8, wherein the caller information of the second terminal is received in a form of a packet.

10. The method of claim 8, wherein the received caller information of the second terminal comprises at least one of a telephone number, a picture, an avatar, and a moving picture corresponding to the second terminal.

11. The method of claim 8, further comprising:
- transmitting caller information of the first terminal from the first terminal during a call after the traffic channel is established.

12. The method of claim 11, wherein the transmitted caller information of the first terminal comprises at least one of a telephone number, a picture, an avatar, and a moving picture corresponding to the first terminal.

13. The method of claim 11, wherein the caller information of the first terminal is transmitted in a form of a packet.

14. The method of claim 8, further comprising:
- determining whether caller information of the first terminal has been sent to the second terminal; and
- transmitting the caller information of the first terminal to the second terminal based on the determination.

* * * * *